Patented Aug. 19, 1947

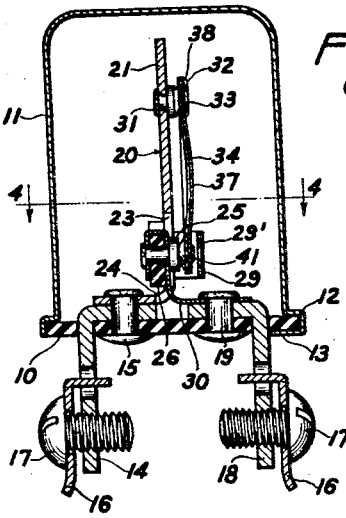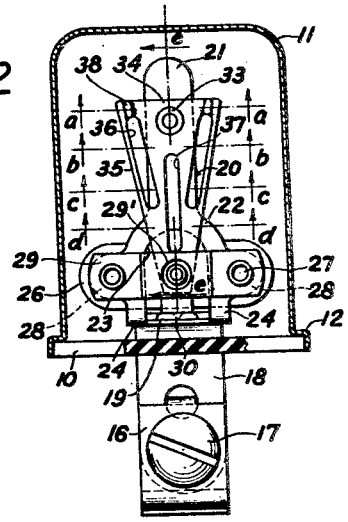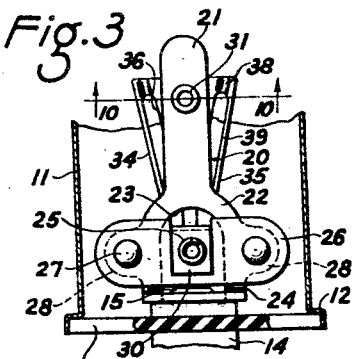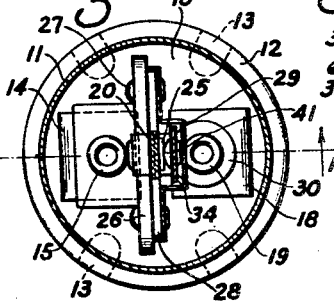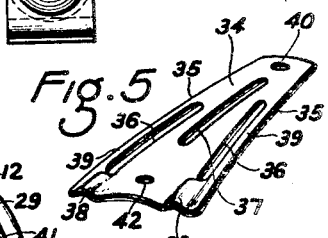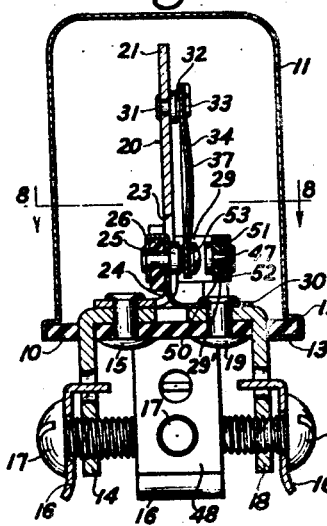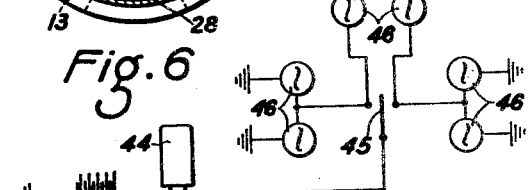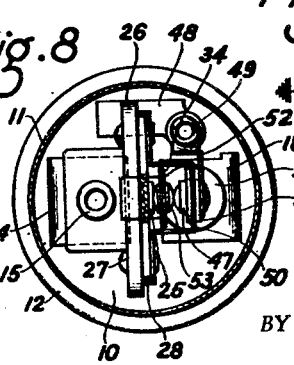

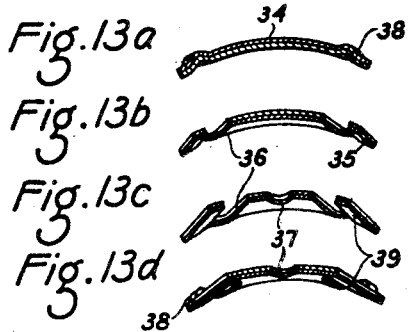

2,425,717

UNITED STATES PATENT OFFICE 2,425,717

THERMOSTATIC SWITCH ASSEMBLY

Frank Robert Bean, Rochester, N. Y., assignor to F. A. Smith Manufacturing Company, Rochester, N. Y.

Application June 25, 1942, Serial No. 448,409

17 Claims. (Cl. 200—138)

The present invention relates to a thermostatic switch assembly and more particularly to a snap acting switch member or arm therefor.

Known snap acting thermostatic switch devices and switch arms have such high mechanical and thermal inertias that they are not capable of critical operation or high frequency actuation, or else are only capable of exerting such low contact pressures that they cannot be used when subject to vibration as on aircraft, automobiles or in similar circumstances. Furthermore, known thermostatic switch assemblies are not adapted for convenient control or adjustment of their operating characteristics within the narrow limits required in practice in the automotive, aeronautical and other fields.

The primary object of the present invention is the provision of a snap acting bimetallic switch member capable of critical operation and of unusually high mechanical and thermal efficiency.

Another object of the invention is the construction of a thermostatic switch assembly for rapidly making and breaking an electric circuit.

A further object of the invention is the provision in a thermostatic switch assembly of means which may be adjusted to vary the frequency and/or critical current or temperature of said make and break.

Another object is the provision of a thermostatic switch assembly which maintains a rapid operating frequency within a narrow range under widely different ambient temperature conditions, which is capable of convenient and accurate adjustment to vary its operating frequency, and which will maintain such operating frequency within a limited range although subject to vibration and/or variable temperature conditions.

Still another object is the provision of a thermostatic switch assembly including a pair of contacts and a snap acting thermostatic switch arm of low thermal capacity and low operating current requirements but withal creating good contact pressure sufficient to withstand opening of the contacts by vibration.

A still further object of the invention is the provision of a thermostatic switch arm formed so as to have operating characteristics which are particularly well suited for use in a high operating frequency switch assembly.

Other and further objects of the invention will be pointed out and/or suggested to those skilled in the art by the description which follows.

The aforementioned and other objects of the invention are embodied in a snap acting switch member of bimetallic sheet material having converging sides and formed to provide progressively varying mechanical stresses therein and arranged so that an electric current will create thermal stresses for reversing the curvature of at least a portion of said switch member. The creation and/or dissipation of said thermal stresses is controlled so that the snap action of the switch member is very critical and can be made to take place within narrow limits with respect to a condition of equilibrium whereby the switch member is ideally suited for high frequency operation. The thermostatic switch assembly of the invention comprises an insulating base, terminal members thereon, an upright support member composed of high resistance conducting metal, such as steel, is provided with an intermediate opening and is mounted at one end upon one of said terminal members, an insulating bridge on one side of said upright support member and carrying a contact within said opening, a beveled stud upon the other end of said support, a thin flexible conductor connected between said contact and the other of said terminal members, a slotted bimetallic blade of converging form mounted at its wider end upon said stud and concave to the beveled end thereof, a contact on the narrow end of said blade for engaging the contact on said bridge, and a bracket also mounted on said bridge and adapted to engage the back of said blade when the same is heated. A second contact for engaging the heated reversely curved blade may be mounted on said bracket.

Reference is hereby made to the accompanying drawings wherein similar reference characters designate similar elements and wherein:

Fig. 1 is vertical section through the thermostatic switch assembly of the invention and taken on the line 1—1 of Fig. 4.

Fig. 2 is a front elevation of said switch assembly.

Fig. 3 is a rear elevation of said switch assembly.

Fig. 4 is a plan view of the switch assembly and a section taken on the line 4—4 of Fig. 1.

Fig. 5 is a perspective view of the preferred form of switch arm according to the invention.

Fig. 6 is a wiring diagram for an automotive direction signal circuit.

Fig. 7 is a vertical section similar to Fig. 1 but illustrating a modified form of said switch assembly.

Fig. 8 is a plan view of the modified switch assembly with a horizontal section taken on the line 8—8 of Fig. 7.

Fig. 9 is a wiring diagram of signal circuits with which the modified form of switch assembly is used.

Figs. 10, 11 and 12 are fragmentary cross-sections taken on the line 10—10 of Fig. 3 and each illustrating different formations of a support post to vary the operating characteristics of the snap acting bimetallic switch member.

Figs. 13a—d are transverse sections and Fig. 13e is a longitudinal section of the bimetallic blade when cold and are taken respectively on the lines a—a to e—e of Fig. 2.

Figs. 14a—e are sections similar to those of Figs. 13a—e but show the curvatures of the bimetallic blade while heating and just prior to snapping.

Figs. 15a—e are sections similar to those of Figs. 13a—e and Figs. 14a—e but show the curvatures of the blade after it has snapped and partially reversed.

Although the thermostatic switch member and assembly of the invention will be described with particular reference to use for rapidly making and breaking a signal circuit, it is to be understood that the invention relates broadly to the formation of a bimetallic switch member and to the construction of a thermostatic switch assembly.

According to the illustrated embodiments of the invention the switch assembly is mounted upon a base 10 which is preferably circular in form and which is composed of an insulating material such as formica, fiber, hard rubber, or the like. For protection from damage, dirt or air currents said switch assembly may be enclosed by a cylindrical cap 11 of metal or transparent material and which has a rim 12 fitting over the periphery of base 10. Tongues 13 on the rim 12 of cap 11 may be bent under to engage and hold the base 10 within the rim 12 of said cap 11.

A plurality of terminal members are attached to the base 10 and extend therethrough for connection in the usual manner to the associated circuits. The terminal post 14 is fastened at one end to base 10 as by a rivet 15 and carries on its other end a washer 16 and a screw 17 for fastening a conductor to said post 14. A second terminal post 18 is also fastened at one end to the base 10 as by a rivet 19 and also carries on its other end a washer and screw for attachment of a conductor to said post 18.

An upright support member 20 is mounted upon the insulated base 10 and preferably has one end fastened directly to said terminal post 14 as by said rivet 15. Said support member 20 is composed of high resistance conducting metal, such as steel, for a purpose to be later explained. Also said support member 20 has an upper end 21, and has an intermediate enlarged portion 22, see Figs. 2 and 3, and which is bifurcated or provided centrally with an opening 23 to form two legs 24 of relatively small cross-section and which legs 24 may be bent angularly.

A stationary contact 25 may be mounted in any suitable manner upon the base 10 or is preferably according to the invention mounted upon an insulating member or bridge 26 which is fastened at opposite ends by rivets 27 to ears 28 extending from opposite sides of the legs 24 which are thereby rendered more rigid. A stop member for limiting movement of the thermostatic element is preferably in the form of a bracket 29, has each of its ends fastened to the ears 28 of support member 20 by said rivets 27, and is provided centrally with a hole 29'. Said bracket 29 may be bent or deformed to vary the cooling time of the snap action thermostatic element, is rendered more rigid by the bridge 26, and the hole 29' therein facilitates bending for adjustment or provides a mounting for another contact later to be described.

A thin flexible conductor 30, such as a copper or phosphor bronze ribbon, has one end engaging the contact 25 and the other end fastened to the terminal post 18 as by the rivet 19. Said one end of the thin flexible conductor 30 may be bent over opposite sides of the insulating bridge 26 as shown in Figs. 2 and 8 and fastened thereto by the head of contact 25 and riveting the end of the stem of said contact 25. If greater flexibility is desired the conductor 30 may be crimped. Connection of the contact 25 to terminal 18 by the thin flexible conductor 30 has at least two advantages. On account of the flexibility of said conductor 30 any movement or vibration of the terminal 18 is not transmitted to said contact 25 and does not affect its position or steadiness which would alter the calibration or impair the operation of the thermostatic device.

A supporting post 31 of conducting metal, such as brass, has at one end a stem riveted to the upper end of support member 20 and at its other end has a beveled or inclined portion 32 from which extends a hollow projection 33 which may be riveted or spun over to engage the thermostatic element.

The thermostatic element or switch member 34 is composed of bimetallic sheet material and is formed so as to produce mechanical, thermal and/or operating characteristics which are of great advantage for a snap acting bimetallic switch arm and which are peculiarly adapted to a rapidly operating snap acting bimetallic arm. Such a switch member 34 is wider at one end than at the other, has converging sides 35 and is preferably somewhat elongated.

The switch member 34 is dished transversely or longitudinally and preferably both transversely and longitudinally by any known method. The transverse curvature of said switch member 34 progressively decreases from the wider end thereof as illustrated by the decreasing curvature of the respective cross-sections shown in Figs. 13a, 13b, 13c, and 13d. The longitudinal curvature of said switch member 34 progressively decreases also from the wider end thereof as shown in Fig. 13e. The deformation of said switch member 34 to produce either or both of said curvatures progressively decreasing from the wider end sets up in the bimetal thereof mechanical stresses which are proportional to said curvature and which are of progressively decreasing magnitude from the wider end of switch member 34.

By reason of the converging form of said switch member 34 and/or on account of one or more slots formed therein, said switch member 34 has sections of decreasing electrical conductance progressively from the wider end and the sections of lesser electrical conductance and thus of greater temperature are arranged to oppose the sections of lesser curvature and smaller mechanical stresses. A pair of converging slots 36 are provided within the switch member 34 along each converging side 35, preferably parallel thereto, and one end of each slot 36 is spaced a substantial distance from the narrow end of switch member 34 while the other end of each slot 36 is spaced only a short distance from the wider end of said switch member 34. A central slot 37 is centrally provided in switch member 34, has one end spaced a substantial distance from the wider end and the other end spaced a smaller distance from the narrower end of said switch member 34.

The switch member 34 is gathered at its wider end by forming crimped portions 38 in the sheet material between the end of the switch member 34 and the ends of converging slots 36 and in longitudinal alignment with said slots 36. Said crimped portions 38 produce in whole or in part the transverse and longitudinal curvatures in the switch member 34 and said crimped portions 38 and/or the dished formation of the switch member 34 are created therein by a forming operation which may be accomplished in suitable dies. The converging slots 36 are spaced from the converging sides 35 of the switch member 34 so as to provide restraining side sections 39 of small cross-section. Preferably, the slots 36 are parallel to the sides 35 so that said restraining sections 39 are also uniform as well as small cross-section.

The narrow end of switch member 34 is provided with a hole 40 through which the stem of a contact 41 extends and which stem is riveted over to fasten the contact 41 securely to said switch member 34. The switch member 34 is also provided near its other or wider end with a hole 42 which is centrally located between the divergent ends of the slots 36. In assembling the switch device the hole 42 is fitted over the hollow projection 33 of the supporting post 31 and while switch arm 34 is held with contacts 25 and 41 in alignment said hollow projection 33 is riveted as by spinning over the walls thereof against switch member 34. The hole 42 or rivet connection just described is located at a "dead spot" or relatively inert portion of the switch member 34 so that the mounting thereof affects its operation as little as possible.

The angle of inclined portion 32 may correspond to the curvature of the switch member 34, see Fig. 10, and so that riveting of projection 33 does not affect the curvature or operation of member 34. On the other hand the taper of inclined portion 32 of post 31 can be made steeper, see Fig. 11, so that upon riveting of projection 33 the curvature and mechanical stress in switch member 34 are increased and the current carrying capacity or operating temperature of said switch member 34 is also increased. Conversely the tapered portion 32 may be flattened or may incline in the opposite direction, see Fig. 12, to reduce the curvature or mechanical stress in switch member 34 when riveted to post 31 and also reduce the current carrying capacity or operating temperature thereof. Such alteration of the taper of inclined portion 32 provides a very simple method of changing the current carrying capacity of the thermostatic switch assembly over a considerable range without altering the design or construction thereof.

Although the thermostatic switch assembly of the invention has electrical, thermal and operating characteristics such that it may be used to advantage under any circumstances particularly where vibration and great ambient temperature differences are encountered, said thermostatic switch assembly and particularly the snap acting switch member thereof are capable of such rapid heating and rapid cooling that the assembly is peculiarly suited for use as a flasher such as a flasher control for the direction signaling circuit of an automobile or truck. For instance such a direction signaling circuit may comprise a battery 43, see Fig. 6, having one side connected to ground and its other side connected to a thermostatic switch assembly 44 like that shown in Figs. 1-4, inclusive, and a single pole double throw switch 45 having its switch arm connected to said switch assembly 44, and having each side connected through a plurality of incandescent lamps 46 to ground. Said lamps 46 are generally arranged in pairs at the front, rear and on the dash-board of the motor vehicle and alternatively operate according to whether switch 45 is moved to "right" or "left" position.

The arrangement of the stop member or bracket 29 as previously described is not only for the purpose of providing a deformable back stop for the thermostatic switch member 34 but may according to a modification of the invention support a second stationary contact 47, see Figs. 7 and 8. Fundamentally the modified form of the thermostatic switch assembly is the same as that shown in Figs. 1-5, inclusive, and described in connection therewith. However, an additional or third terminal post 48 is fastened by a rivet 49 to the base 10 and carries a washer 16 and screw 17 similar to those on terminal posts 14 and 18. An insulating bushing 50 is placed between the head of contact 47 and bracket 29 and has circular projection fitting into the hole 29' therein. A second insulating bushing 51 is held between the bracket 29 and the riveted end of contact 47 so that said contact 47 is mounted upon but completely insulated from bracket 29. A flexible conductor 52, in the form of a copper or phosphor bronze ribbon, has one end secured to contact 47 and is preferably provided with a hole through which the stem of contact 47 extends prior to riveting thereof. The other end of flexible conductor 52 is fastened in a similar manner under the head of rivet 49 so that movement and/or vibration of terminal post 48 does not affect the position of said contact 47 and change in position thereof by bending bracket 29 does not tend to move terminal post 48. A double contact 53 is fastened to the narrow end of switch arm 34, has one face for engaging the stationary contact 25 on bridge 26, and has another face for engaging stationary contact 47 on bracket 29. Said stationary contact 47 thereby performs the dual function of a contact and a limiting stop for the snap acting switch member 34.

Said modified form of the switch assembly is useful for alternately engaging a higher resistance circuit which may include a signal and/or a resistance, preferably a variable resistance, for controlling the cooling time of the thermostatic switch member 34. The primary or normally closed circuit, see Fig. 9, comprises a battery 43 having one side connected to ground and the other side normally connected through a thermostatic switch assembly, such as shown in Figs. 7 and 8, to lamps 46 and to ground.

When the thermostatic switch assembly is heated and flexed in a manner to be explained, said switch member 34 has a snap action to break contacts 25 and 53 and to make contacts 53 and 47 whereby said other side of battery 43 is connected through a resistance 54, which is preferably variable, to a lamp 46 and to ground to complete the alternative or secondary circuit. The resistance of said alternative circuit may be so high that no appreciable heating of switch member 34 will be caused by the current carried thereby or the resistance of the alternative circuit may be reduced so as to cause some heating of said switch member 34 and retard its cooling. Variation of the resistance of said alternative circuit provides an electrical method of controlling the frequency of operation of the modified form of the thermostatic assembly shown in Figs. 7 and 8 when operating as a flasher.

The structural features of the thermostatic switch assemblies just described and shown in Figs. 1–5, 7 and 8 are of distinct advantage with all types of snap acting or dished bimetallic switch members and particularly in association with a dished bimetallic switch member with converging sides and slotted as shown in Figs. 13a—e, 14a—e, and 15a—e, inclusive.

An outstanding feature of the thermostatic switch assembly according to the invention is that the upright support member 20 may be bent toward or away from the switch member 34 to vary the temperature at which or range of temperature within which the switch member 34 will operate or change curvature. For instance, bending the upright support 20 toward the switch member 34, or toward the right as viewed in Figs. 1 and 8, will decrease the effective mechanical stresses in the switch member 34 to decrease temperature at which the same operates. Conversely, bending the upright support member 20 away from the switch member 34, or toward the left as viewed in Figs. 1 and 8, will increase the effective mechanical stresses in switch member 34 to increase the operating temperature thereof.

The frequency of operation of switch member 34 is varied by changing the position of the stop member or bending bracket 29. Moving the stop member or bracket 29 nearer to the contact 25 limits the opening movement of switch member 34, reduces the time for it to return to contacting position, and therefore increases the frequency of operation of the switch assembly as a flasher. On the other hand moving or bending the bracket 29 away from the contact 25 permits the switch member 34 to snap through further increasing its cooling time and reducing its frequency of operation.

The upright support member 20 is composed of a material having relatively high electrical resistance, such as steel, and the bifurcation of support member 20 by the provision of an opening 23 to form the legs 24 of small cross-section serves not only to increase the electrical resistance and heating of support member 20 but also to facilitate bending of said support member 20 for calibration of the switch assembly as just explained. The heat from the support member 20 is imparted to the switch member 34 both by radiation to that surface of the bimetallic member 34 which has the higher coefficient of expansion and by conduction through the supporting post 31. Such heating of the bimetallic switch member 34 by radiation and conduction from the support member 20 reduces the effect of a low ambient temperature to increase the time of initial operation of the switch member 34 and/or increasing the frequency of its operation as a flasher.

The insulating bridge 26 imparts a certain rigidity thereto and to the stop member or bracket 29 without affecting the ease of bending the support member 20 for purposes of calibration and constitutes a mounting on one side of the support member 20 so that the stationary contact 25 is presented for engagement by the contact 41 on the switch member 34 which is mounted upon the opposite side of said support member 20. The insulating bridge 26 provides high resistance to heat conduction from the support member 20 and the small cross-section of the flexible conductor 30 reduces to a minimum the heat loss from contact 25 and from the switch member 34 to the terminal post 18. Thus said flexible conductor 30 serves both to prevent imparting of movement and/or vibrations from terminal post 18 to contact 25 or bridge 26 and to prevent any appreciable heat loss therefrom or from the switch member 34 which also contributes to maintaining the thermostatic switch member 34 nearer its critical or operating temperature.

The formation of the switch member 34 is a very important feature of the invention and in practise produces advantages and characteristics not embodied in any of the known forms of snap acting bimetallic switch elements. While the operation of said switch member 34 has been extensively studied and investigated including the making of high speed or "slow motion" motion pictures thereof, the theory of operation has not been definitely ascertained. However, it is quite evident that good contact pressure is maintained between contacts 25 and 41 even under conditions of severe vibration until the switch member 34 operates to open said contacts, that snap action of the switch member 34 to open said contacts 25 and 41 occurs within a consistent and very limited range of current values rendering the switch assembly ideal for use as a protective device, and/or that there is very rapid heating and cooling of the snap acting bimetallic switch member 34 so that the switch assembly can be used as a flasher over a wide range of frequencies.

A theory of operation of the switch member 34, when constructed according to the invention, has been developed and appears to explain the aforementioned beneficial results but it must be understood that any fallacy in the theory about to be presented shall not affect the scope or validity of the invention.

When the switch member 34 is cold as shown in Figs. 13a–e inclusive, the transverse and longitudinal curvatures thereof progressively decrease from the wider toward the narrow end on account of the crimped portions 38 restraining sections 39, and preformation or dishing of the bimetallic material of which switch member 34 is composed. Mechanical stresses proportional to said curvatures are created in said switch member 34 and the provision of slots 37 and 39 therein leaves central current carrying sections 54 between said slots and of progressively decreasing electrical conductance extending away from the wider end of said member 34. Said restraining sections 39 are of smaller cross-sectional area and less electrical conductance than said current carrying sections 54. Under these conditions a maximum stress section occurs near the wider end of member 34 and sections of decreased mechanical stress occur at places of lesser curvature.

When an electric current passes from one end to the other of switch member 34, thermal stresses are created particularly in the concave side of the bimetal and in opposition to said mechanical stresses. The center current carrying sections 54, being of larger cross-sectional area, have lower electrical resistance so that larger currents pass therethrough and larger thermal stresses are created therein than those in said restraining sections 39 and consequently deflect or expand to a greater extent. As a result opposing thermal stresses are created more rapidly in those areas or sections of high current density or in the narrower portions of current carrying sections 54. While the maximum thermal stresses occur at sections of high current density, the greater deflections caused by thermal deformation occur at sections of greater width so that resultant curvatures are as shown in Figs. 14a–e inclusive. As the switch member 34 approaches the point of equilibrium or snapping condition, the curvature decreases from the sections of maximum current density to those of lower current density and build up sufficient energy due to the additional deflections at sections of larger cross-section until they overbalance the mechanical stresses in the restraining sections 39.

Since the center sections 54 have a relatively large deflection as compared with that of the restraining sections 39, the degree of curvature at any particular section will depend upon the cross-sectional area at that point and be most determined by the thermal stresses in the center sections 54. Consequently, the section of maximum curvature and mechanical stress may occur at some intermediate section of the switch member 34 such as at the section illustrated in Figs. 14b or 14c. However, the definite predominance of the mechanical stresses at all sections and particularly at the section of maximum curvature continues during the heating cycle to maintain good contact pressure between contacts 25 and 41.

As the current through or the temperature of the switch member 34 increases, the thermal stresses at least in some section of control current carrying sections 54 exceed the mechanical stresses at that section and the restraining energy in the sections 39 and the blade deflects at least in part with opposite curvature, see Figs. 15c, 15d, and 15e and contacts 25 and 41 are separated. It may well be that the mechanical stresses at other sections will still predominate as at the sections shown at 15a and 15b. The shape of switch member 34, the arrangement of the slots 37 and 39, and/or the amount of gathering by the crimped portions 38 may be varied to control the sections reversing curvature or so that they will all reverse curvature.

It will now be clearer that bending of the upright support member 20 increases or decreases the effective longitudinal and thus also the transverse curvatures or mechanical stresses in the switch member 34 so that a higher temperature and greater thermal stresses will be required to reverse said member 34 or so that a lower temperature and less thermal stresses can so reverse it. Also by progressively counteracting the mechanical stresses, the whole switch member 34 is near an equilibrium condition and small increases in current or temperature are sufficient to cause the thermal stresses to predominate and cause reversal at least at some section so that the switch member 34 responds to current values within a very limited range.

Also on account of the converging form of the switch member 34 the amplitude or deflection thereof when heated to open the contacts 25 and 41 is one-third greater than for a switch member of rectangular shape because of the known principles of mechanics for the deflection of beams.

As soon as the contacts 25 and 41 of the preferred modification of the invention are opened, the current in switch member 34 is interrupted or reduced and said member 34 cools off for return to "on" position. Due to the increasing cross-sectional area toward the wider and supported end of switch member 34 the heat is rapidly conducted away from the sections of maximum or greater temperature and thus relieving the thermal stresses in the order of their temperatures. When the thermal stresses are reduced to a point at which the mechanical stresses again predominate then the switch member 34 returns to its original position, contacts 25 and 41 are closed, and the cycle is repeated.

Since many variations of the thermostatic switch assembly in addition to those disclosed may be made, the present disclosure is to be construed as illustrative. The scope of the invention is defined by the claims which follow.

Having particularly described my invention, what I desire to secure by Letters Patent of the United States and what I claim is:

1. A thermostatic switch assembly comprising a support member, a contact, and a snap acting switch member composed of bimetallic sheet material having converging sides, provided with a longitudinal slot having substantially parallel sides, and having a current carrying portion progressively increasing in cross-section toward the wider end of said switch member.

2. A thermostatic device comprising a support, a contact, and a switch member composed of an integral bimetallic sheet material which is dished both transversely and longitudinally, having converging sides, provided with a pair of laterally spaced longitudinally extending slots each having parallel sides and each respectively parallel to one of said converging sides, and having a converging current carrying portion progressively decreasing in cross-section toward the narrower end of said switch member.

3. A thermostatic device comprising a support, a contact, and a switch member composed of a slotted integral bimetallic sheet material having converging sides, dished both transversely and longitudinally with progressively decreasing curvatures away from its wider end, and having its wider end fastened to said support with its free narrower end adapted to engage said contact.

4. As an article of manufacture, a snap acting switch member of bimetallic sheet material having converging sides, dished with progressively decreasing curvatures and mechanical stresses away from its wider end, and adapted when heated to create thermal stresses in opposition to said mechanical stresses, and including a section of progressively increasing electrical resistance away from said wider end and adapted when said switch member carries an electric current to create a predominating thermal stress to overcome a lesser mechanical stress and reverse the curvatures of only a portion of said switch member.

5. As an article of manufacture, a snap acting switch member of bimetallic sheet material having converging sides, dished with progressively decreasing curvatures and mechanical stresses away from its wider end, and adapted when heated to create thermal stresses in opposition to said mechanical stresses, and provided with a pair of converging slots and a central intermediate slot to form sections of progressively decreasing electrical conductance away from said wider end and adapted when an electric current is passed through said switch member to create predominating thermal stresses and overcome lesser mechanical stresses and reverse the curvature of a portion of said switch member.

6. A thermostatic switch assembly comprising a support member, a contact, and a snap acting switch member composed of bimetallic sheet material having converging sides, fastened at its wider end to said support with its free end adapted to engage said contact, provided with a pair of slots each having parallel sides and each respectively parallel to one of said converging sides, and having crimped portions at the wider end of said switch member opposite the ends of said slots and drawing said switch member to provide a concave surface adjacent said support member.

7. A thermostatic switch assembly comprising a support member, a contact, a snap acting switch arm composed of bimetallic sheet material, having converging sides and provided with a pair of co-extensive converging slots having parallel sides and each parallel to one of said converging sides and provided with a central slot having one end spaced farther from the end of said switch arm than the ends of said converging slots, and a fastening member between said support member and said switch arm and attached thereto between said converging slots and adjacent the end of said central slot.

8. As an article of manufacture, a snap acting elongated switch member of bimetallic sheet material having converging sides, dished with progressively decreasing curvatures and mechanical stresses away from its wider and supported end, provided with a pair of slots each having parallel walls and each respectively parallel to one of said converging sides and adapted when heated to create a predominating thermal stress for reversing the curvature of a portion of said switch member, and including a central section of progressively decreasing thermal conductivity away from said supported and wider end for rapidly conducting heat away from and cooling the reversed portion of said switch member so that it may promptly return to its mechanically stressed condition.

9. As an article of manufacture, a snap acting elongated switch member of bimetallic sheet material having converging sides, dished with progressively decreasing curvatures and mechanical stresses away from its wider and supported end, and adapted when heated to create a predominating thermal stress for reversing the curvature of a portion of said switch member, and provided with a pair of slots each having parallel walls and each respectively parallel and adjacent to one of said converging sides and forming central sections of progressively decreasing thermal conductivity away from said supported wider end for rapidly conducting heat away from and cooling the reversed portion of said switch member so that it may promptly return to its mechanically stressed condition.

10. A thermostatic switch assembly comprising a base, a current carrying support member mounted upon said base, composed of relatively high electrical resistance material and provided centrally with an opening to form two legs each of small cross-section, an insulating member fastened to said support member and carrying a contact within said opening, and a switch member of bimetallic sheet material mounted at one end on said support member in spaced relation thereto and having its free end adapted to engage said contact.

11. A thermostatic switch assembly comprising a base, a conducting support member mounted upon said base, composed of high resistance metal and provided centrally with an opening to form two legs each of small cross-section, an insulating member fastened to said support member and carrying a contact within said opening, a switch member of bimetallic sheet material mounted at one end on said support member in parallel spaced relation thereto and having its free end adapted to engage said contact, a stirrup member having its ends fastened to said legs and having a central portion encompassing the free end of said switch member, and a second contact mounted on but insulated from said central portion and adapted to engage and limit the movement of said switch member away from the first mentioned contact.

12. A thermostatic switch assembly comprising a base, a pair of terminal members on said base, a support member mounted upon one of said terminal members, said support and terminal members being more readily bendable in the same predetermined plane, an insulating member on said support member and carrying a contact, a bimetallic switch member mounted at one end on said support member and having its free end adapted to engage said contact, and a thin flexible conducting ribbon connected between said contact and said other terminal member and having its thin dimension parallel to said plane.

13. A thermostatic switch assembly comprising a base, a pair of terminal members on said base, an upright support member composed of steel, provided intermediately with an opening, and mounted upon one of said terminal members, an insulating member on one side of said support member and carrying a contact within said opening, and a switch member composed of bimetallic sheet material, mounted at one end upon the unsupported end of and in parallel spaced relation to said support member on the opposite side from said insulating member, and a thin copper ribbon connected between said contact and the other terminal member.

14. A thermostatic switch assembly comprising a support member, a snap acting switch member composed of dished bimetallic sheet material, and a post fastened at one end to said support member and having an inclined portion and projecting portion which is deformed to fasten the switch member to said post, the normal curvature of said switch member being determined by the surface contact between said switch member and the inclined portion of said post.

15. A thermostatic switch assembly comprising a base of insulating material, a pair of terminal posts mounted on said base, a steel support member having a bifurcated portion and mounted at one end upon one of said posts, a brass stud mounted upon the other end of said support and having a beveled end, an insulating bridge attached to said support and extending across the bifurcated portion thereof, a contact mounted on said bridge, a thin flexible conductor connected between said contact and the other of said posts, a dished snap acting bimetallic blade of converging form mounted at its wider end upon said stud and concave to the beveled end thereof, a contact on the narrow end of said blade for engaging the contact on said bridge, and a bracket also mounted on said support member and adapted to engage the back of said blade when the same is heated.

16. A thermostatic switch assembly comprising a base of insulating material, a pair of terminal members on said base, an upright support member mounted at one end upon one of said terminal members and provided centrally with an opening to form two legs of small cross-section, an insulating bridge fastened at opposite ends respectively to said legs and carrying a contact within said opening, a convergent shaped switch member of dished bimetallic sheet material, provided with a pair of converging slots having parallel sides, and having crimped portions at the ends of each slot, a post fastened at one end to said support member and having at its other end an inclined portion, and a projecting portion which is deformed to fasten the wider end of said switch member to said post with a minimum surface contact between the inclined portion of said post and the concave surface of the dished switch member, a flexible conductor of small cross-section connected between said contact and said other terminal member, and a stop member mounted on said support member and adapted to engage the free end of said switch member and limit its movement away from said contact.

17. A thermostatic switch assembly comprising a base of insulating material, three terminal members on said base, an upright support member mounted at one end upon one of said terminal members and provided centrally with an opening to form two legs of small cross-section, an insulating bridge fastened at opposite ends respectively to said legs and carrying a contact within said opening, a convergent shaped switch member of dished bimetallic sheet material, provided with a pair of converging slots having parallel sides, and having crimped portions at the ends of each slot, a post fastened at one end to said support member and having at its other end an inclined portion, and a projecting portion which is deformed to fasten the wider end of said switch member to said post with a minimum surface contact between the inclined portion of said post and the concave surface of the dished switch member, a flexible conductor of small cross-section connected between said contact and the second terminal member, a stop member mounted on said support member and carrying a second contact adapted to engage the free end of said switch member and limit its movement away from said contact, and a second conductor connected between said second contact and the third terminal.

FRANK ROBERT BEAN.

REFERENCES CITED

The following references are of record in the file of this patent:

UNITED STATES PATENTS

| Number | Name | Date |
| --- | --- | --- |
| 1,809,293 | Claytor | June 9, 1931 |
| 2,267,463 | Hood et al. | Dec. 23, 1941 |
| 1,747,252 | Leamon | Feb. 18, 1930 |
| 1,704,461 | Chance | Mar. 5, 1929 |
| 1,791,225 | Rankin | Feb. 3, 1931 |
| 2,286,053 | Bletz | June 9, 1942 |
| 1,492,345 | Barton | Apr. 29, 1924 |
| 2,157,560 | Neece | May 9, 1939 |
| 2,249,837 | Lee | July 22, 1941 |
| 2,098,181 | Dillman | Nov. 2, 1937 |
| 2,299,562 | Burch | Oct. 20, 1942 |
| 2,157,560 | Neece | May 9, 1939 |
| 847,555 | Craft | Mar. 19, 1907 |
| 2,173,083 | Ray | Sept. 12, 1939 |